ULTRAHIGH-FREQUENCY TUNING APPARATUS

Filed Dec. 19, 1945 3 Sheets-Sheet 1

*INVENTOR.*
EDUARD KARPLUS
*BY* Melvin R. Jenney
Attorney

Dec. 11, 1951 E. KARPLUS 2,578,429

ULTRAHIGH-FREQUENCY TUNING APPARATUS

Filed Dec. 19, 1945 3 Sheets-Sheet 2

INVENTOR.
EDUARD KARPLUS
BY Melvin R. Jenney
Attorney

Dec. 11, 1951 E. KARPLUS 2,578,429

ULTRAHIGH-FREQUENCY TUNING APPARATUS

Filed Dec. 19, 1945 3 Sheets-Sheet 3

INVENTOR.
EDUARD KARPLUS
BY Melvin R. Jenney
Attorney

Patented Dec. 11, 1951

2,578,429

UNITED STATES PATENT OFFICE 2,578,429

ULTRAHIGH-FREQUENCY TUNING APPARATUS

Eduard Karplus, Belmont, Mass., assignor to General Radio Company, Cambridge, Mass., a corporation of Massachusetts Application December 19, 1945, Serial No. 636,027

8 Claims. (Cl. 250—16)

Figure 1:
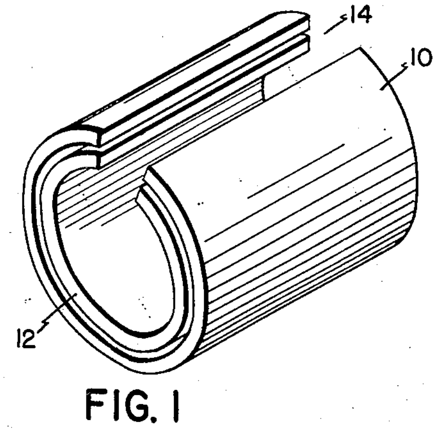

The present invention relates to ultra-high-frequency tuning apparatus.

In the construction of tuning apparatus for high frequencies several important factors must be taken into account: First; the unit should have a wide tuning range of resonant frequency. Second; the "Q" value (ratio of reactance to resistance) should be high over the whole range. Third; conveniently accessible terminals should be available for external connections, as for instance for connections to ground or for connections to an oscillator tube. The terminals should subtend a maximum of the available circuit impedance. And finally; the design should be mechanically simple and capable of smooth variations of resonant frequency without the necessity of sliding contacts.

The conditions are easily fulfilled for the lower radio frequencies. For ultra-high frequencies, which may be here defined as frequencies above 100 mc., many difficulties, either of an electrical or mechanical nature are encountered.

The usual lumped parameter circuits, consisting of coil and condenser combinations, are unsatisfactory at ultra-high frequencies. The tuning range is poor because of unavoidable residual impedances. (By residual impedances are meant such effects as distributed capacitance in the coil and residual inductance in the condenser.) These residual impedances also limit the terminal impedance of the unit. The sliding contacts used in most of the conventional avilable tuning elements make for erratic operation at ultra-high frequency. The "Q" value is not sufficiently high because of the high losses necessitated by the combination of two independent units which make up the tuning circuit.

A coaxial transmission line is an example of a resonant circuit with admirable electrical characteristics, but it suffers from construction difficulties if an appreciable frequency range has to be covered. Thus in a 500 megacycle quarter wave resonator a line of about six inches is nessary, and a plunger travel of three inches is required for a frequency vaariation of 500 to 1000 megacycles. The mechanical construction of the plunger is necessarily awkward, and erratic operation due to sliding contacts is difficult to avoid.

The circuit now known as the "butterfly," shown in the Karplus and Peterson Patent No. 2,367,681, issued Jan. 23, 1945, avoids some of the difficulties inherent in the transmission line, and so far as I am aware, is the only prior lumped-parameter circuit suitable for ultra-high-frequency operation. It is especially satisfactory in cases where a wide tuning range is required. The wide range is attained by simultaneous variation of capacitance and inductance. The losses are higher than in the transmission line particularly at the high-frequency end of the range, although the losses are low enough for most applications.

When a tuning unit is to be used in an oscillator circuit, the maximum frequency that can be produced is limited, not only by the available tubes, but also by the means for connecting tubes into the circuit. The absolute limitation on frequency is the resonant frequency of the tube itself, which is the frequency at which the tube will resonate when its grid and plate terminals are directly connected together. However, it is frequently impossible to approach closely the resonant frequency of the tube with conventional tuning circuits or buterfly circuits because the connections between the tube and the tuning device introduce extraneous impedances which limit the tuning range.

According to the present invention, there is provided a high-Q tuning element which is variable over a wide frequency range, and is particularly suitable for connection to other circuit elements. The preferred form of the invention consists essentially of two slotted cylinders, one rotating within the other. The outer cylinder is usually the stator and the inner cylinder the rotor. If the new tuning element is considered as a parallel combination of inductance and capacitance across the slot of the stator, the variation of resonant frequency is primarily obtained by variation of capacitance, the inductance remaining substantially constant. The capacitance across the stator slot is varied as the slot of the rotor cylinder rotates with respect to the slot in the stator.

Figure 2:
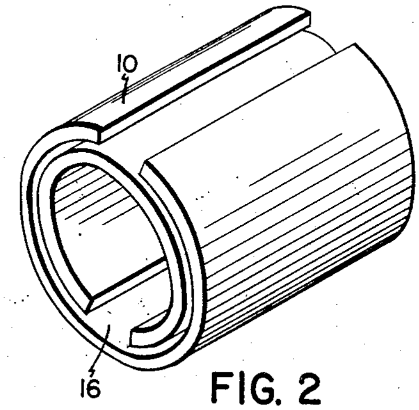
Figure 3:
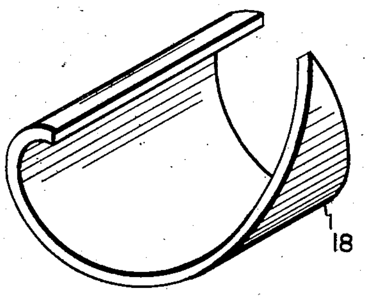
Figure 4:
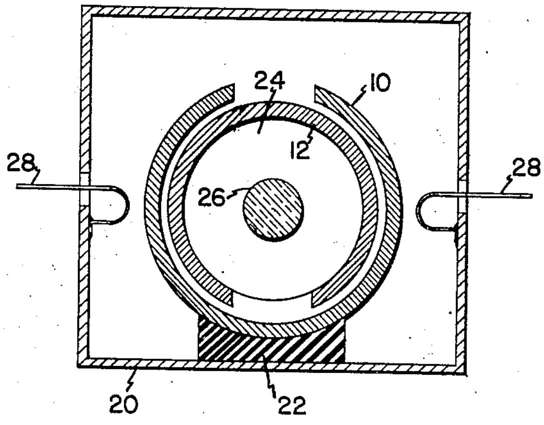
Figures 5, 6, 8, 13:
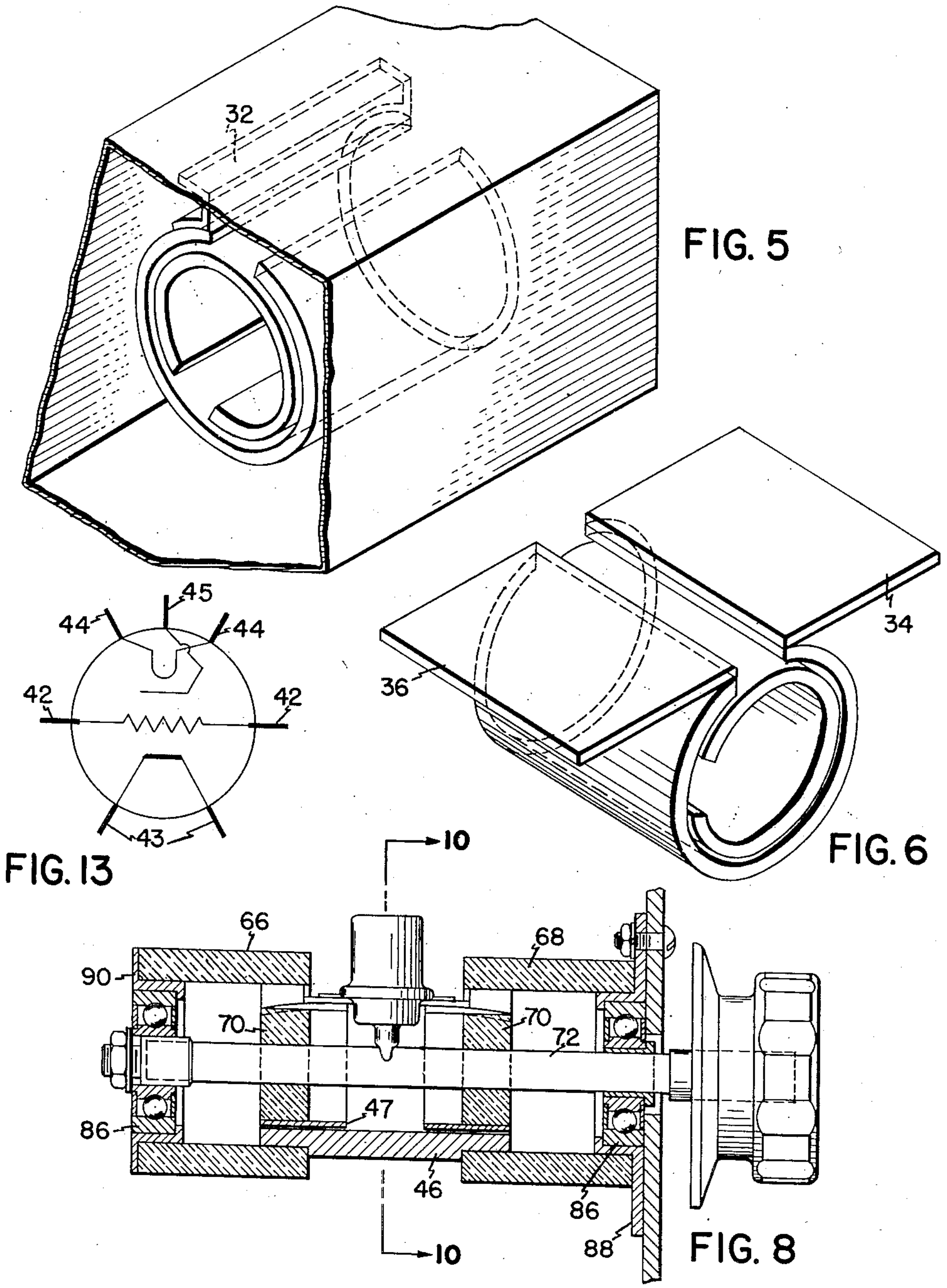
Figure 9:
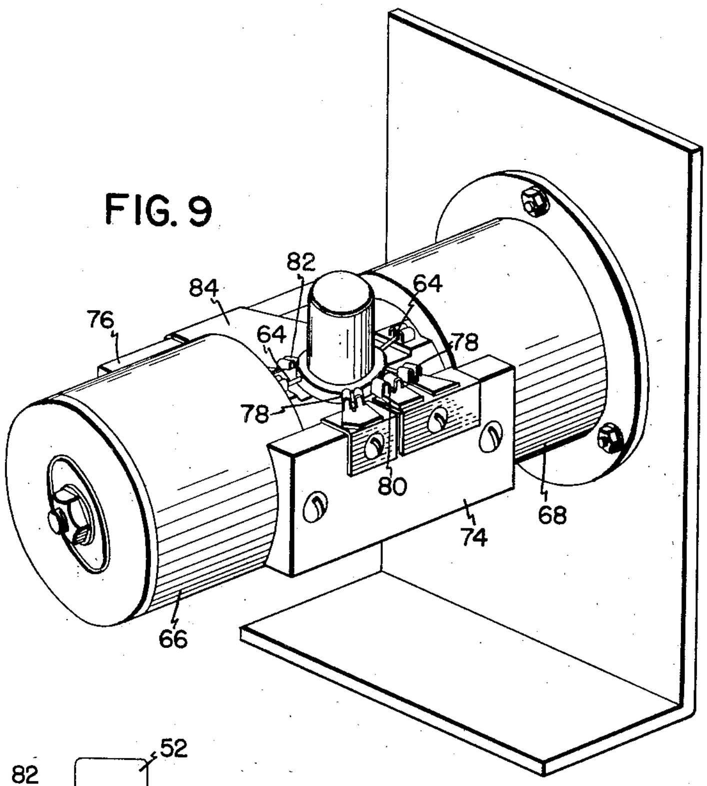
Figures 7, 10, 11, 12:
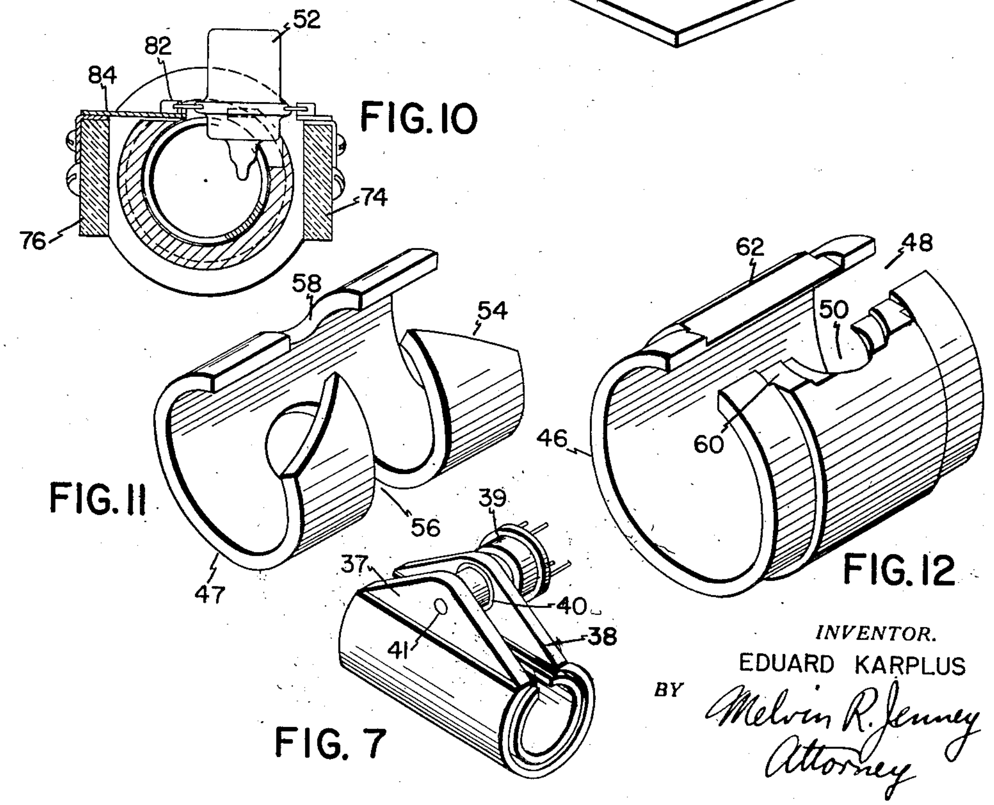

In the accompanying drawings Figs. 1 and 2 are diagrammatic views illustrating the principles of the invention; Fig. 3 is a detail view of a rotor shaped to provide a desired frequency distribution; Fig. 4 is a sectional elevation of a wave-meter embodying the present invention; Fig. 5 is an isometric view illustrating a connection to ground; Fig. 6 is an isometric view illustrating the use of the unit in a circuit where external connections are required; Fig. 7 is a view of an oscillator according to the present invention; Fig. 8 is an elevation of an oscillator embodying the present invention and using a multiple-terminal tube; Fig. 9 is a perspective view of the apparatus shown in Fig. 8; Fig. 10 is a section on line 10—10 of Fig. 8; Figs. 11 and 12 are detail views of the rotor and stator of the oscillator; and Fig. 13 is a diagram of the prong arrangement of a tube which may be used with the circuit of Figs. 8 to 12.

The tuning unit of the present invention is shown in principle in Figs. 1 and 2. It comprises essentially two substantially coaxial metal cylinders 10 and 12 with portions removed throughout their length. As shown in Figs. 1 and 2 the removed portions constitute circumferential gaps in the form of simple longitudinal slots extending throughout the length of the cylinders. The outer cylinder 10 has a longitudinal slot 14 and the inner cylinder 12 is provided with a longitudinal slot 16 of about the same width as the slot 14. It will be understood that the maximum frequency range is obtained when the two cylinders are mounted coaxially. The cylinders are mounted for relative rotation between the positions of Figs. 1 and 2. Good precision can be obtained since no sliding contacts are used, and since rotor and stator are inherently simple and of a shape which can be accurately manufactured.

Either the outer or the inner cylinder of Fig. 1 alone represents a tuned circuit for a fixed frequency. This fixed frequency is determined by the inductance of the slotted cylinder which may be considered a single turn loop, and by the capacitance from one side of the slot to the other. For a cylinder of 1 inch inside diameter and 2 inches length, the inductance is about 0.01 microhenries. If the slot is ¼ inch wide and the wall of the cylinder is ⅛ inch, the capacitance is about 1 micromicrofarad. Under these conditions, the resonant frequency of the single slotted cylinder is 1600 megacycles. By increasing the capacitance across the slot, as by making it narrower, the resonant frequency can be lowered. According to the present invention a variable capacitance across the slot is provided, in order to change the resonant frequency.

This is accomplished by the use of a second slotted cylinder, as shown in Figs. 1 and 2. The presence of the inner cylinder reduces the inductance of the outer cylinder by a small amount since magnetic flux at high frequencies cannot pass through metal. With a spacing of 1/64 inch, the capacitance between the two cylinders is about 80 micromicrofarads and does not vary substantially with rotation.

The capacitance across the slot of the outer cylinder varies with rotation of the inner cylinder. While this variation of capacitance would not have any significance at low frequencies, near the very high frequency at which the cylinder resonates, however, the two opposing sides of the slot have opposing potentials, and the capacitance between them determines the resonant frequency of the cylinder.

At these ultra-high frequencies the voltage distribution along the circumference of the cylinders is nearly sinusoidal with a neutral line in the middle of each cylinder and with the maximum voltage appearing at the ends.

With the relative position of the two cylinders as shown in Fig. 1, there is practically no potential difference between the two cylinders and the capacitance between them has no effect upon the capacitance that appears across the slot of the outer cylinder. With the relative position of the two cylinders as shown in Fig. 2, however, displacement currents will flow from one end of the outer cylinder to the middle of the inner cylinder and from there to the other end of the outer cylinder. In effect then, the total capacitance between the two cylinders, which was 80 micromicrofarads, is divided into two capacitances which are connected in series across the slot of the outer cylinder. This results in a capacitance of one quarter of 80, or 20, micromicrofarads. Due to the sinusoidal voltage distribution along the circumference of the cylinder, the final effective capacitance between the ends of the slots is further reduced by the factor $2/\pi$ to 12 micromicrofarads. This factor $2/\pi$ is the ratio of the average to the peak value of a sine wave. This value of 13 micromicrofarads is to be added to the original capacitance of about 1 micromicrofarad across the slot of the outer cylinder, making a total of 14 micromicrofarads.

In Fig. 1 wherein the slots are opposite each other the circuit is tuned for minimum capacitance and maximum frequency, while in Fig. 2 wherein the inner cylinder has been rotated through 180 degrees, the circuit is tuned for maximum capacitance and minimum frequency. The tuning unit described, therefore, has a substantially constant inductance of .01 microhenry, and an effective capacitance variable from 1–14 micromicrofarads, giving a tuning range of 420–1600 megacycles per second.

It will be understood that the specific values set forth above are illustrative only, and the invention is not limited thereto.

The "Q" of a circuit according to the present invention is inherently high, due to the simple geometry of the circuit in which currents flow over wide surfaces. It should be understood that radiation losses will reduce the "Q" considerably unless shielding is used to prevent radiation.

The rotor or stator cylinder may be shaped with a gap of variable width for any desired frequency distribution; thus in the construction shown at 18 in Fig. 3, the rotor (inner cylinder) is formed with a "circumferential gap" disposed on a helix. When used with a stator having a simple longitudinal slot, the unit has a substantially logarithmic variation of frequency against angle of displacement.

Conveniently accessible terminals can be provided along the slot of the stator which subtend the total available circuit impedance. In any case where external connections are required, one or both of the terminals formed by the equipotential surfaces adjacent to the slot in the outer cylinder can be used. These large terminals are useful in many applications, as for instance where it is necessary to make connections to ground or connections to certain tubes which depend for their high-frequency performance on low impedance connections to large or widely spaced terminals.

The application of the unit to various circuits will now be described. In Fig. 4 is shown a wavemeter comprising the parts shown in Fig. 1, mounted within a shield 20. This device requires no direct connections to external circuits but high Q and good precision are important. With radiation prevented by the shield, the unit has a very high Q, which in the case of the unit described above covering 420 to 1600 megacycles, is in the neighborhood of 1000 over the whole frequency range.

The unit may be supported in the shield in any suitable manner. As shown in Fig. 4, the stator is supported on an insulating cradle 22. The rotor is mounted on an insulating disk 24, through which passes an insulating shaft 26 journaled in suitable bearings in the shield. Coupling members 28 may be passed through openings in the shield and attached to the inner surface thereof, one serving as an "antenna" and the other being connected to any conventional detecting apparatus.

In applications where one or both terminals are to be connected to external circuits, as in a filter application, the connections may be made as shown in Figs. 5 and 6. In Fig. 5 one terminal of the stator is grounded by connecting a metal sheet 32 between the shield and the entire length of the stator along one side of the slot. In Fig. 6, similar connections are made to both terminals by sheets 34 and 36. Since the currents are conducted to the unit over wide sheets of metal, the effects of lead impedances are substantially eliminated.

For use in an oscillator, the unit is especially adapted for operation with large-terminal tubes or multiple-terminal tubes. Thus in Fig. 7, there is shown a tuning unit according to the present invention, having tube-terminal metal brackets 37 and 38 upstanding from the stator and extending entirely along the slot at both sides thereof, the brackets having openings to receive a tube 39, here shown as a "lighthouse" tube. The brackets are provided with suitable openings to afford large-surface contact with the grid and plate terminals 40 and 41 respectively, of the tube. Thus, as in Figs. 5 and 6, the currents are conducted to the unit over wide sheets, and full advantage is taken of the high resonant frequency of the tube itself.

A unit for operation with a multiple-terminal tube, typified by the 6F4 acorn tube, is shown in Figs. 8 to 12. The prong arrangement of this type of tube is shown in Fig. 13. The tube has two grid prongs 42 arranged at opposite sides of the tube, two plate prongs 43 which are spaced at a considerable angle at one side of the tube, heater prongs 44 and a cathode prong 45. The resonant frequency of this particular tube is about 1400 mc. The resonant frequency of any tube is determined by the interelectrode capacitances of the tube, and by the unavoidable internal and external inductances in the connections between these electrodes. The doubling of the plate and grid terminals causes reduction of the over-all inductive effects. The resonant frequency of the Type 6F4 tube therefore is about twice as high as the resonant frequency of a conventional acorn tube which has only one terminal each for plate and grid. By use of the tuning equipment of the present invention, full advantage of this reduced inductance can be taken since the two grid terminals, as well as the two plate terminals which have been widely spaced to reduce inductance can be connected to the large unipotential surfaces formed by the areas adjacent to the stator slot. It should be noted that this advantage would be lost, if the two grid and the two plate terminals of the tube had to be connected to two small terminals of a conventional tuning device.

As shown in Figs. 8 to 12, the outer cylinder or stator 46 is shown in detail in Fig. 12, while the inner cylinder or rotor 47 is shown in Fig. 11. The gap 48 of the outer cylinder is essentially a longitudinal slot, except that a semi-circular opening 50 is provided to accommodate the base of tube 52. In the rotor the gap 54 may be shaped to give a desired frequency distribution. The tube base is received in circumferential channels 56 and 58. Since parts of the tube itself are interposed between the grid terminals, the openings 50, 56 and 58 are necessary to allow the glass envelope of the tube to enter the tuning circuit and to allow the shortest possible connections to the grid terminals. It will be understood that the cylinders may be similarly cut away to accommodate any external circuit device which is to be connected to the unit.

Adjacent to the slot the outer cylinder has flat surfaces or ledges 60 and 62 for mounting the tube. The surfaces 60 are provided with two grid terminal clips 64 spaced along the cylinder adjacent to the slot 48.

The stator is supported on tubes of insulating material 66 and 68 which are received on the ends of the stator. The rotor is mounted on disks 70 through which a shaft 72 of insulating material passes. Insulating supports 74 and 76 are secured to the tubes 66 and 68. The heater and cathode terminals 78 and 80 are mounted on the support 74 and are provided with suitable clips for the corresponding tube prongs. The plate terminals 82 are supported on a platform 84 slightly above the ledge 62. The platform 84 is secured to the support 76. By reason of the necessity of connecting the plate supply to the plate terminals, these terminals cannot be mounted directly on the metal part of the outer cylinder but are insulated therefrom. The capacitance between the platform 84 and the ledge 62 of the cylinder is equivalent to a direct connection for the high resonant frequencies.

The shaft is journaled in ball bearings 86 suitably supported in end plates 88 and 90. In general the unit would be shielded, but for convenience of illustration, the complete shielding is omitted from Figs. 9 and 10. It will be understood that the end plates may form a part of the shield. The mounting of the unit as shown in Figs. 9 and 10 is satisfactory for any equipment in which this apparatus is used, since the remote disposition of the bearings and the use of an insulating shaft minimizes any erratic operation that might occur by reason of variable contact within the bearings.

Having thus described the invention, I claim:

1. A tuning unit for ultra-high frequencies comprising two substantially coaxial metal cylinders, each having a slot extending in a generally axial direction throughout the length of the cylinder and having its edges opposed across a narrow gap, each cylinder having high resonant impedance across said gap, the potential at or near the resonant frequency varying circumferentially around each cylinder from one edge of the gap to the other, and means for mounting the cylinders coaxially for rotation of one relative to the other but insulated from each other, the inductance of the unit being substantially constant for all positions and the effective capacitance of the unit being variable from a minimum when the slots of the two cylinders are substantially aligned with each other to a maximum upon relative rotation, whereby the resonant frequency may be varied.

2. A tuning unit as defined in claim 1 in which at least one of the cylinders has a slot having its edges opposed across a narrow gap at one position of its length, the gap being of variable width along the slot in the cylinder to provide a desired variation of resonant frequency with angle of rotation.

3. A tuning unit as defined in claim 1 in which substantially equi-potential terminal connection means are disposed along one cylinder adjacent to the edges of the slot.

4. A tuning unit as defined in claim 1 having a substantially equi-potential terminal connection comprising a metal sheet connected with one of the cylinders along substantially the full length thereof adjacent to one edge of the slot.

5. A tuning unit as defined in claim 1 having spaced multiple terminals for an electrode of an electron discharge device and mounting means for the electron discharge device on the unit with said spaced multiple terminals connected with one of the cylinders at spaced points along one side of the slot.

6. A tuning unit as defined in claim 1 having terminals for multiple grid connections spaced along the outer cylinder at one side of the slot and terminals for multiple plate connections spaced along the outer cylinder at the opposite side of the slot.

7. A tuning unit as defined in claim 1 in which the cylinders have cutaway portions to accommodate an external circuit device in proximity to the cylinders.

8. A tuning unit as defined in claim 1 having spaced multiple terminals for one of the electrodes of an electron discharge device, and mounting means for the electron discharge device on the unit with said spaced terminals connected with one of the cylinders at spaced points along one side of the slot, the cylinders having cutaway portions to accommodate a portion of the envelope of the electron discharge device.

EDUARD KARPLUS.

REFERENCES CITED

The following references are of record in the file of this patent:

UNITED STATES PATENTS

| Number | Name | Date |
|---|---|---|
| 1,641,687 | Nolte | Sept. 6, 1927 |
| 2,086,331 | Holmes | July 6, 1937 |
| 2,100,412 | Scott | Nov. 30, 1937 |
| 2,120,518 | Dreyer | June 14, 1938 |
| 2,126,868 | Brown | Aug. 16, 1938 |
| 2,181,871 | Conklin | Dec. 5, 1939 |
| 2,301,163 | Koch | Nov. 3, 1942 |
| 2,330,822 | Fischer | Oct. 5, 1943 |
| 2,367,681 | Karplus et al. | Jan. 23, 1945 |
| 2,409,073 | Sias | Oct. 8, 1946 |
| 2,453,489 | Bruntil et al. | Nov. 9, 1948 |
| 2,448,554 | Simopoulos | Sept. 7, 1948 |
| 2,482,393 | Wilburn | Sept. 20, 1949 |
| 2,483,893 | Everett | Oct. 4, 1949 |

FOREIGN PATENTS

| Number | Country | Date |
|---|---|---|
| 458,710 | Great Britain | Dec. 24, 1936 |